United States Patent
Karis et al.

(12) 
(10) Patent No.: US 6,194,360 B1
(45) Date of Patent: Feb. 27, 2001

(54) MAGNETIC RECORDING DEVICE

(75) Inventors: Thomas Edward Karis, San Martin; Holavanahally S. Nagaraj, Morgan Hill, both of CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/219,111

(22) Filed: Dec. 22, 1998

(51) Int. Cl.$^7$ .................. C10M 141/10; C10M 141/03; G11B 19/00
(52) U.S. Cl. ............ 508/438; 508/100; 360/99.08; 360/99.04; 360/98.07; 310/67 R; 310/90
(58) Field of Search .................... 508/100, 438; 360/99.08, 99.04, 98.07; 310/67 R

(56) References Cited

U.S. PATENT DOCUMENTS

| | | | |
|---|---|---|---|
| 3,869,394 | 3/1975 | Daniels et al. | 252/46.7 |
| 3,970,570 | 7/1976 | Pratt et al. | 252/49.9 |
| 4,096,079 * | 6/1978 | Pardee . | |
| 4,551,258 | 11/1985 | Ikeda et al. | 252/32.7 |
| 4,780,229 | 10/1988 | Mullin | 252/32.5 |
| 4,841,393 | 6/1989 | MacLeod et al. | 360/98.07 |
| 4,879,052 | 11/1989 | Mullin | 252/32.5 |
| 4,894,740 | 1/1990 | Chhabra et al. | 360/103 |
| 5,296,981 | 3/1994 | Ogawa | 360/99.08 |
| 5,438,467 | 8/1995 | Dorius et al. | 360/103 |
| 5,448,119 | 9/1995 | Kono et al. | 310/67 R |
| 5,489,711 | 2/1996 | Lai | 564/434 |
| 5,502,605 | 3/1996 | Myokan | 360/99.08 |
| 5,560,849 | 10/1996 | Shankwalkar et al. | 508/423 |
| 5,641,841 * | 6/1997 | Diaz et al. | 508/410 |
| 5,744,431 * | 4/1998 | Diaz et al. | 508/410 |
| 5,907,456 * | 5/1999 | Khan et al. | 360/99.08 |
| 5,930,075 * | 7/1999 | Khan | 360/99.08 |
| 5,940,247 * | 8/1999 | Karis et al. | 360/99.08 |

FOREIGN PATENT DOCUMENTS

11228985 * 8/1999 (JP) .
11269475 * 10/1999 (JP) .

OTHER PUBLICATIONS

R.L. Cottington et al., "Interactions in Neopentyl Polyo-1–Ester—Tricresyl Phosphate—Iron Systems at 500 F", ASLE Transactions 12, Oct. 1969, pp. 280–286, Date unavailable.

F. Lockwood et al., "Ester Oxidation—The effect of an Iron Surface", ASLE Transactions, vol. 25, 2, 1982, pp. 236–244, Date unvaiable.

* cited by examiner

Primary Examiner—Jacqueline V. Howard
(74) Attorney, Agent, or Firm—Robert B Martin

(57) ABSTRACT

The invention relates to a magnetic recording data storage device which can operate effectively at high rotational speeds. The magnetic recording device of the present invention comprises (a) a magnetic recording disk, (b) a spindle motor, (c) a head supported on an air bearing carrier, and (d) an actuator connected to the head carrier for moving the head across the rotating disk. The spindle motor comprises ball bearings lubricated by a grease comprising a polymeric amine and bis or tris (alkyl phenyl)phosphate. The grease improves rotational operation of the disk drive.

9 Claims, 3 Drawing Sheets

MAGNETIC RECORDING DEVICE

BACKGROUND OF THE INVENTION

1. Field of the Invention

The present invention relates to a magnetic recording device having an improved spindle motor lubricant.

2. Description of the Background Art

Current growth rates for digital magnetic recording data storage industry show a significant annual increase in recording densities and transfer rate and a decrease in seek time. To continue on this growth rate curve, the recording industry is being forced to make a number of significant changes in the design and operation of the magnetic recording device. Digital magnetic recording devices for data storage generally comprise a thin film magnetic recording disk, a spindle motor for rotating the disk, and a head or transducer which is moved along or above the surface of the rotating disk to read and write information on the disk. The thin film magnetic recording disks generally comprise a substrate, a magnetic layer such as a cobalt-based metal alloy, a protective amorphous carbon layer and a layer of perfluoropolyether disposed on the carbon overcoat. The magnetic recording disks are mounted on a spindle motor which rotates the disk at a high rotational speed. The spindle motor generally comprises (i) a spindle shaft attached to a housing, (ii) a spindle hub rotatably mounted on the shaft, and (iii) lubricated ball bearings positioned in races formed in the shaft and/or hub.

The head or transducer is attached to a carrier or slider having an air bearing surface which is supported during operation adjacent the data surface of the disk by a cushion of air generated by the rotating disk.

The recording device also comprises a positioning actuator connected to the carrier for moving the head to the desired location on the disk during reading or writing operations.

Conventional magnetic recording devices are operated at a rotational speed of about 3,600 RPM to 7,000 RPM. It has been discovered that during normal operation of the disk drive at higher rotational speeds, e.g., >7,500 RPM, the recording device begins to undergo acoustic vibrations associated with chemical breakdown of the spindle bearing grease lubricant within a short period of time. Continued operation of the recording device in the presence of the acoustic vibrations leads to mechanical failure of the spindle bearing.

It is an object of the present invention to provide an improved magnetic recording device which operates for extended periods of time at higher rotational speeds without unacceptable acoustic vibrations.

Other objects and advantages will be apparent from the following disclosure.

SUMMARY OF THE INVENTION

The present invention relates to a digital magnetic recording data storage device which can operate effectively at high rotational speeds. The magnetic recording device of the present invention comprises (a) a magnetic recording disk; (b) a spindle motor associated with the disk operable for rotating the disk at selected rotational speeds of 3,000 RPM to >7,000 RPM, e.g., 10,000–20,000 RPM; (c) a head supported on an air bearing carrier (head and carrier are an integral member) for magnetically writing data to or magnetically reading data from the magnetic layer on the disk; and (d) an actuator connected to the head carrier for moving the head across the rotating disk. The spindle motor is preferably a brushless direct current spindle motor comprising (i) a spindle shaft attached to a housing, (ii) a spindle hub rotatably mounted on the shaft, and (iii) ball bearings positioned in races formed in the shaft and/or hub and lubricated by an improved grease. The improved grease is the key feature of the present invention. The improved grease comprises a polymeric amine and bis or tris (alkyl phenyl)phosphate. The grease improves the rotational operation of the disk drive.

A more thorough disclosure of the present invention is presented in the detailed description of the invention which follows and the accompanying figures.

DETAILED DESCRIPTION OF THE INVENTION

The present invention relates to an improved high performance digital magnetic recording device for reading and writing data magnetically.

Figure 1:
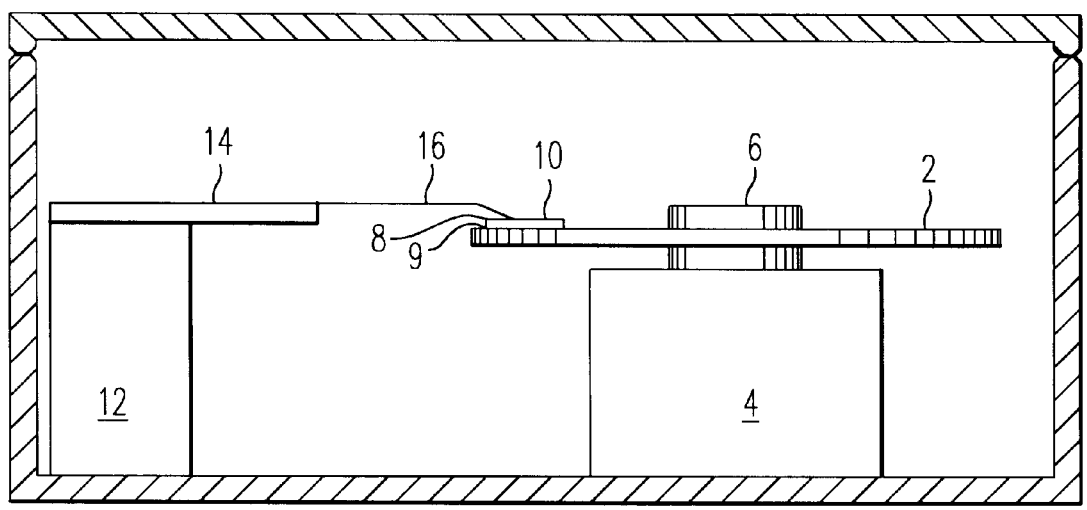
FIG. 1 is a section view of the magnetic recording disk drive.
Figure 2:
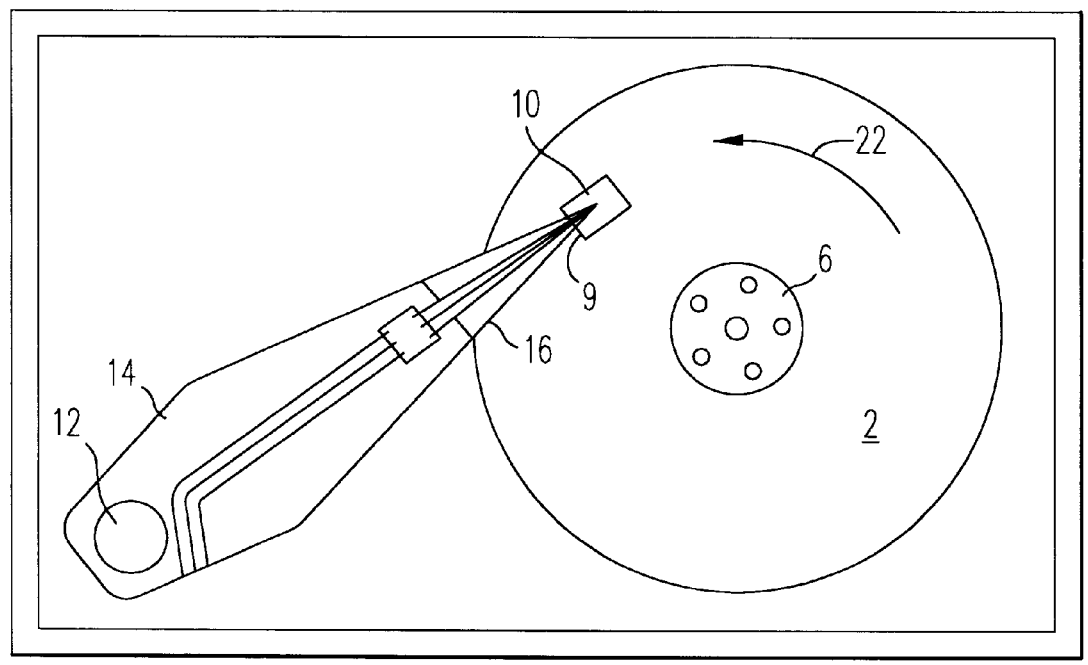
FIG. 2 is a top view of the magnetic recording disk drive.

Referring to FIGS. 1 and 2, there is shown a magnetic recording disk drive of the present invention. The magnetic recording disk 2 is rotated by spindle motor 4 with hub 6, which is attached to the drive motor. The disk generally comprises a substrate, a metallic magnetic layer, an optional carbon layer and a bonded or non-bonded polymeric layer, e.g., perfluoropolyether.

A read/write head or transducer 8 is formed on the trailing end of a carrier, or slider 10. Suitable sliders are positive or negative air bearing sliders. Suitable negative air bearing sliders are disclosed in U.S. Pat. Nos. 4,894,740 and 5,438,467 the disclosures of which are incorporated herein by reference. Head 8 may be an inductive read and write transducer or an inductive write transducer with a magnetoresistive read transducer. The slider 10, is connected to the actuator 12 by means of a rigid arm 14 and suspension 16. The suspension 16 provides a bias force which urges the slider 10 onto the surface of the recording disk 2.

During operation of the disk drive, the spindle motor 4 rotates the disk 2 at a constant speed in the direction of arrow 22; and the actuator 12, which is typically a linear or rotary motion coil motor, moves the slider 10 generally radially across the surface of the disk 2 so that the read/write head may access different data tracks on disk 2.

Figure 3:
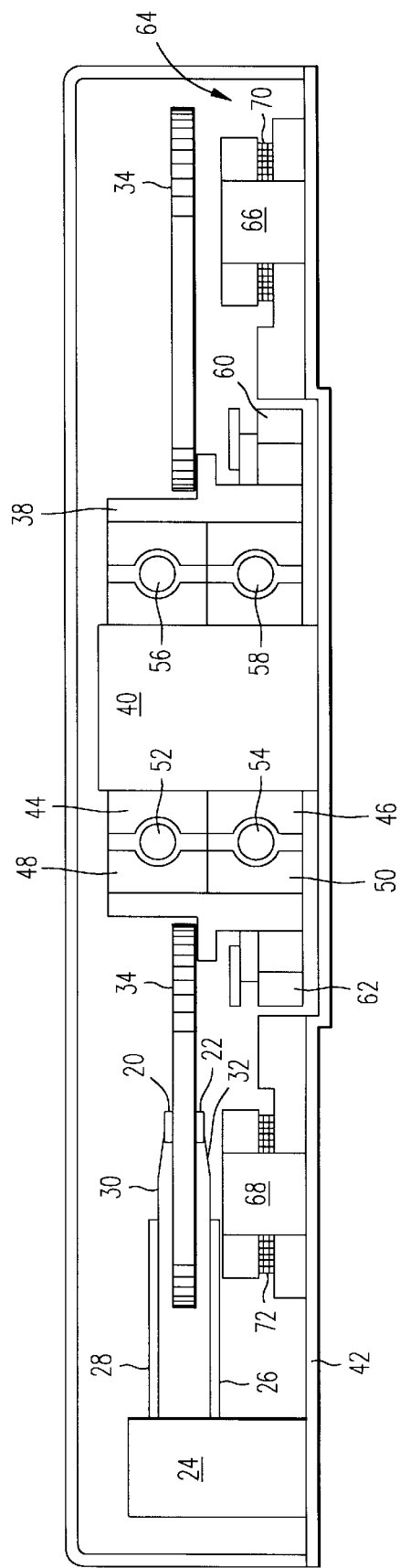
FIG. 3 is a cross sectional view of another embodiment of a magnetic recording device.

Referring to FIG. 3, heads 20 and 22 are connected to actuator 24 by means of arms 26 and 28 and suspensions 30 and 32. Disk 34 is supported on hub or rotor 38, which is rotatably mounted on shaft 40. Shaft 40 is supported on housing 42. A plurality of permanent magnets (e.g., 60 and 62) as sections of an annular ring magnet are attached to hub 38. Stator 64 has a plurality of axial posts 66 and 68 and coils 70 and 72 disposed around the posts. Magnets 60 and 62 are preferably made of high moment magnetic material such as neodymium-iron-boron or samarium-cobalt. The annular ring magnet comprises a plurality of individual magnet sections with magnetic fields which alternatively point radially outwardly and inwardly around the ring. When an electrical current is applied to each coil of the stator, a magnetic field is induced which attracts or repels the permanent magnet sections to cause rotation of the hub.

Figure 4:
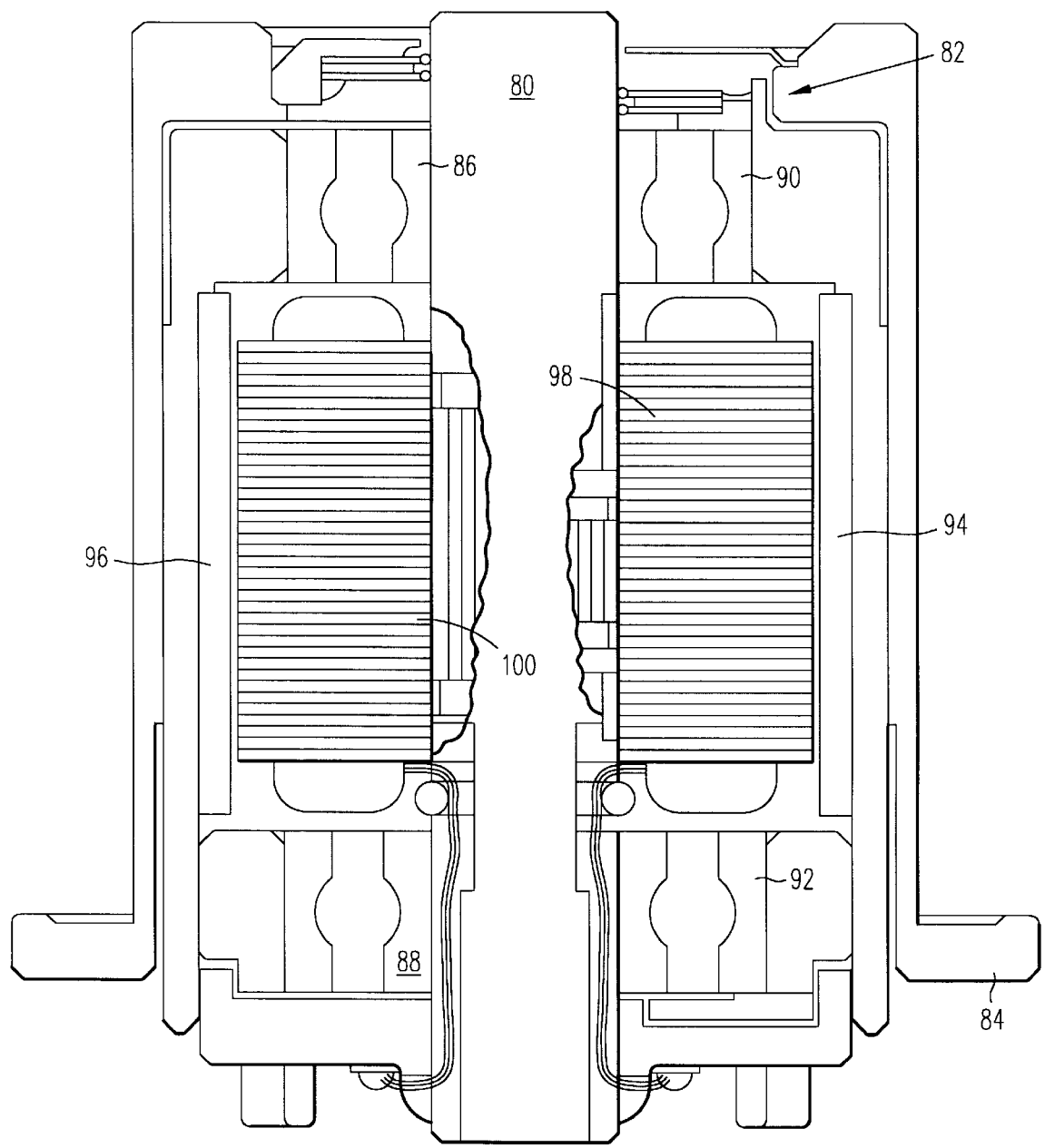
FIG. 4 is a cross sectional view of another embodiment of a spindle motor.

An annular race is formed between hub 38 and shaft 40. Suitably the annular race comprises inner races 44 and 46 which are attached to and part of shaft 40 and outer races 48 and 50 which are attached to and part of hub 38. Ball bearings 52, 54, 56 and 58 are disposed in the annular race track formed by races 44, 46, 48 and 50. Referring to FIG. 4, there is shown an in-hub brushless DC spindle motor comprising shaft 80 and hub 82 having lip 84 for supporting the disk. The shaft has inner races 86 and 88 and hub has outer races 90 and 92. Permanent magnet sections 94 and 96 are attached to hub 80. Coils 98 and 100 of stator are attached to shaft 80. Other suitable spindle motors are known to those skilled in the art, such as disclosed in U.S. Pat. Nos. 5,502,605, 4,841,393, 5,448,119, 4,841,393 and 5,296,981, the disclosures of which are incorporated herein by reference for all purposes.

The annular race is in contact with a unique lubricating grease which lubricates the ball bearings moving in the race. The grease generally comprises a polymeric aromatic amine and bis or tris (alkyl phenyl)phosphate.

The first component of the present invention is a polymeric amine, preferably an amine copolymer. The amine copolymer is formed by reacting an akylated diphenylamine with phenylnapthylamine or an alkylated phenylnapthylamine. Suitable alkylated diphenyl amines have one or more lower alkyl ($C_{1-10}$) substituents on one or both of the phenyl rings. Preferably, the substituents are ($C_{6-9}$), more preferably octyl substituents. Preferably, the amine has 1-3 substituents, e.g., mono, di or tri octyl substituents. A preferred amine reactant is di-octyl diphenyl amine.

Suitable alkylated phenyl napthyl amines have one or more lower alkyl ($C_{1-10}$) substituents on one or both of the aromatic rings. Preferably, the substituents are $C_{6-9}$, more preferably octyl substituents. Preferably, the amine has 1-3 substituents, e.g., mono, di or tri octyl substituents. A preferred amine reactant is N-phenyl-1-naphthyl amine or N-(p-octyl phenyl)-1-naphthyl amine. Suitable polymeric amine is the copolymer of dioctyldiphenylamine and octylated phenyl α-naphthyl amine. In an alternative embodiment, the alkylated diphenyl amine and alkylated phenyl napthyl amine can be co-polymerized with other monomers, e.g., unsubstituted phenyl naphthyl amine.

Suitably, the reaction to form the polymeric amine is catalyzed by an organic peroxide and elevated temperature under nitrogen. Suitably, the amine polymers have a number average degree of polymerization of from about 2 to about 10, preferably about 4 to about 7. Suitably, diarylamine A and diarylamine B starting components are mixed with an ester lubricant or a hydrocarbon solvent under inert atmosphere. The weight of ester lubricant or hydrocarbon solvent is the same as the total weight of diarylamines. The mixture is heated to between 14020 C. to 150° C. A t-butyl peroxide (1.3×the total moles of diarlyamine) is added dropwise over a ½ to 1 hour time period. The t-butyl alcohol reaction product of the t-butyl peroxide is distilled off while maintaining the temperature at 140° C. to 150° C. for up to 5 hours. The temperature is then raised to between 170° C. to 180° C. to remove low molecular weight impurities. The resulting mixture is a low molecular weight amine polymer in ester oil. Preferably less than 10 mole of the total diarylamines are chemically condensed with the ester lubricants or other reaction solvents.

The second component of the grease is bis or tris (lower $C_{1-6}$ alkyl phenyl)phosphate. A suitable phosphate is tri cresyl phosphate (TCP). Other suitable phosphates include phosphorus-containing acid ester component which may be selected from triesters of phosphoric acid with alcohols such as straight and branched chain aliphatic alcohols having from 1 to about 8 carbon atoms. Typically these esters are triethyl phosphate, tributyl phosphate and triisooctyl phosphate. Other suitable phosphoric acid esters include esters of phenol and naphthol. These esters may have from 1 to about 3 $C_1$ to $C_{10}$ alkyl substituents on one or more of the aryl moieties. Exemplary of these esters are tricresyl phosphate, tri-phenyl phosphate, and so on.

The grease of the present invention comprises an oil and a thickener. Suitable oils include ester oils (e.g., synthetic ester oils) and mineral oils (e.g., polyalpha olefin oil). Preferably, the oil is an ester oil. The ester oil may have chain branching and may have some unreacted hydroxyl groups. Suitable ester oils are di-$C_{1-10}$alkyl (e.g., dioctyl, dibutyl, diethyl, hexyl) sebacate, pentaerythritol tetra esters of $C_{1-10}$ carboxylic acids, tri-$C_{1-6}$ alkyl and trimethylol propane triheptanoate and triglycerides. Suitable ester oils have the formula: $C(CH_2OOC(CH_2)x\ CH_3)_4$ where x is 1–10. A preferred ester oil is pentaerythritol tetrapentanoate. Suitable thickener, such as fatty acid salts and polyurea, will be known to those skilled in the art. Suitable fatty acid surfactants include alkali or alkaline (e.g., lithium, sodium, calcium, barium) $C_{10}$–$C_{26}$ (preferably $C_{16-20}$) fatty acid salts optionally having one or more hydroxy substituents. A preferred surfactant is lithium 12 hydroxysterate. Other surfactants include alkali palpitate and alkali icosanate ($C_{20}$).

The grease will generally comprise about 90 weight % of oil and about 10 weight % of thickener. The grease of the present invention will preferably comprise about 0.5 to about 5 weight % of the polymeric amine (preferably about 1 to about 4 weight %) and about 0.1 to about 5 weight % of the phosphate (preferably about 1 to about 2 weight %).

Surprisingly, the synergistic interaction of the grease components enables long term high speed operation of the magnetic recording device without degradation of performance. Other minor components (e.g., less than 5 weight %), such as antioxidants (e.g., zinc diamyldithiocarbamate), metal deactivators (e.g., N,N'-disalicylidene-1,2-propanediamine), anti-wear agents, corrosion inhibitors and other additives, known to those skilled in the art, can also be added to the grease.

The following examples are detailed descriptions of the present invention. The detailed descriptions fall within the scope of, and serve to exemplify, the more generally described invention set forth above. The examples are presented for illustrative purposes only, and are not intended as a restriction on the scope of the invention.

EXAMPLE

Two lubricant compositions were tested for stability. Each lubricant composition comprised the copolymer amine of the present invention (copolymer of phenylnapthylamine and dioctyldiphenylamine) and one had TCP. Each lubricant composition was placed in a 50 ml pyrex beaker and covered with tin foil. A 5 mm hole in the center of the tin foil allowed periodic sampling for analysis. Clean ball bearings were immersed in the composition. The compositions were monitored by UV spectroscopy, and failure was detected by sudden absorbance between 200–300 nm. The results are shown in the table below. It can be seen from the results that the composition having both the polymeric amine and the TCP exhibited synergistic improvement in stability.

| Polymer (wt %) | TCP (wt %) | Temp. (° C.) | Lifetime (hours) |
|---|---|---|---|
| 0 | 0 | 150 | 275 |
| 0 | 1 |  | 180 |
| 2 | 0 |  | 3700 |
| 2 | 1 |  | >7000(T) |
| 0 | 0 | 170 | 72 |
| 2 | 0 |  | 1300 |
| 2 | 1 |  | >2900(T) |

T = truncated

Although this invention has been described with respect to specific embodiments, the details thereof are not to be construed as limitations for it will be apparent that various embodiments, changes and modifications may be resorted to without departing from the spirit and scope thereof, and it is understood that such equivalent embodiments are intended to be included within the scope of this invention.

We claim:

1. A magnetic recording device for reading or writing magnetically comprising.
   (a) a magnetic disk;
   (b) a head supported on an air bearing slider for magnetically reading data to or magnetically writing data from the magnetic layer on the disk;
   (c) a spindle motor for holding the disk comprising a shaft, a rotor and a plurality of bearing interposed between the shaft and rotor, the bearings lubricated by a grease comprising a polymeric aromatic amine formed from the reaction of $C_{1-10}$ dialdyl diphenyl amine and phenylnapthylamine or $C_{1-10}$ dialkyl phenylnapthylamine and bis or tris (lower alkyl phenyl) phosphate; and
   (d) and actuator connected to the slider for moving the head across the disk.

2. The device of claim 1 wherein the diphenyl amine is dioctyl diphenyl amine.

3. The device of claim 2 wherein the phosphate is tricresyl phosphate.

4. A magnetic recording device for reading or writing magnetically comprising:
   (a) a magnetic disk;
   (b) a head supported on an air bearing slider for magnetically reading data to or magnetically writing data from the magnetic layer on the disk;
   (c) a spindle motor for holding the disk comprising a shaft, a rotor and a plurality of bearings positioned in an annular race formed between the shaft and rotor, the bearings lubricated by a grease comprising a polymeric aromatic amine formed from the reaction $C_{1-10}$ dialkyl diphenyl amine and phenylnapthylamine or $C_{1-10}$ dialkyl phenynapthylamine and bis or tris (lower alkyl phenyl)phosphate; and
   (d) an actuator connected to the slider for moving the head across the disk.

5. The device of claim 4 wherein the diphenyl amine is dioctyl diphenyl amine.

6. The device of claim 4 wherein the phosphate is tricresyl phosphate.

7. A spindle motor for use in a magnetic recording device comprising a shaft, a rotor and a plurality of bearings positioned in an annular race formed between the shaft and rotor, the bearings lubricated by a grease comprising a polymeric aromatic amine formed from the reaction of $C_{1-10}$ dialkyl diphenyl amine and phenylnapthylamine of $C_{1-10}$ dialkyl phenylnapthylamine and bis or tris (lower alkyl phenyl)phosphate.

8. The device of claim 7 wherein the diphenyl amine is dioctyl diphenyl amine.

9. The device of claim 7 wherein the phosphate is tricresyl phosphate.

* * * * *